US012010722B2

(12) United States Patent
Rosa et al.

(10) Patent No.: US 12,010,722 B2
(45) Date of Patent: Jun. 11, 2024

(54) WIDEBAND COMMUNICATIONS BASED ON AVAILABILITY ASSESSMENT

(71) Applicant: Nokia Technologies Oy, Espoo (FI)

(72) Inventors: Claudio Rosa, Randers (DK); Tao Tao, Shanghai (CN); Kari Hooli, Oulu (FI); Esa Tiirola, Oulu (FI); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 395 days.

(21) Appl. No.: 17/422,981

(22) PCT Filed: Feb. 1, 2019

(86) PCT No.: PCT/CN2019/074445
§ 371 (c)(1),
(2) Date: Jul. 14, 2021

(87) PCT Pub. No.: WO2020/155106
PCT Pub. Date: Aug. 6, 2020

(65) Prior Publication Data
US 2022/0078843 A1 Mar. 10, 2022

(51) Int. Cl.
H04W 74/0808 (2024.01)
H04L 27/00 (2006.01)
(Continued)

(52) U.S. Cl.
CPC ..... H04W 74/0808 (2013.01); H04L 27/0006 (2013.01); H04W 72/0453 (2013.01); H04L 5/001 (2013.01)

(58) Field of Classification Search
None
See application file for complete search history.

(56) References Cited

U.S. PATENT DOCUMENTS

2018/0205507 A1  7/2018  John Wilson et al.
2019/0253200 A1* 8/2019  Salem ............... H04W 74/0808
(Continued)

FOREIGN PATENT DOCUMENTS

CN   107026724 A   8/2017
CN   107534869 A   1/2018
(Continued)

OTHER PUBLICATIONS

Office action received for corresponding Chinese Patent Application No. 201980091011.6, dated Oct. 26, 2022, 7 pages of office action and no page of translation available.
(Continued)

Primary Examiner — Anh Vu H Ly
(74) Attorney, Agent, or Firm — Lippes Mathias LLP

(57) ABSTRACT

Example embodiments relate to wideband communications based on availability assessment. A method for communication comprises performing availability assessment on a set of configured frequency subbands to obtain an availability result, the availability result indicating that at least one of the set of configured frequency subbands is available for a period of time for transmission of intended information and transmitting supplementary information that has been prepared using the at least one frequency subband during a first portion of time within the period of time. The method also comprises preparing the intended information based on the availability result and transmitting the prepared intended information using the at least one frequency subband during a second portion of time following the first portion of time within the period of time. As such, the processing of the intended information can be adapted depending on the dynamic available subband(s) indicated by the availability result.

15 Claims, 8 Drawing Sheets

(51) Int. Cl.
  *H04W 72/0453* (2023.01)
  *H04L 5/00* (2006.01)

(56) References Cited

U.S. PATENT DOCUMENTS

| | | | |
|---|---|---|---|
| 2020/0045733 A1 | 2/2020 | Tiirola et al. | |
| 2020/0170008 A1* | 5/2020 | Sun | H04W 72/0453 |
| 2021/0321392 A1* | 10/2021 | Hooli | H04L 5/0053 |
| 2021/0352633 A1* | 11/2021 | Tiirola | H04W 72/0453 |
| 2021/0385859 A1* | 12/2021 | Liu | H04W 16/14 |
| 2021/0400719 A1* | 12/2021 | Oh | H04W 74/006 |
| 2021/0410186 A1* | 12/2021 | Hajir | H04W 74/0816 |
| 2022/0039158 A1* | 2/2022 | Awadin | H04W 72/23 |
| 2022/0078843 A1* | 3/2022 | Rosa | H04L 27/0006 |

FOREIGN PATENT DOCUMENTS

| | | | | |
|---|---|---|---|---|
| CN | 108012579 A | | 5/2018 | |
| CN | 108476123 A | | 8/2018 | |
| CN | 108810905 A | | 11/2018 | |
| WO | WO-2019219155 A1 | * | 11/2019 | H04L 47/76 |
| WO | 2020/144402 A1 | | 7/2020 | |

OTHER PUBLICATIONS

Office action received for corresponding Chinese Patent Application No. 201980091011.6, dated May 18, 2023, 5 pages of office action and no page of translation available.

"Revised SID on NR-based Access to Unlicensed Spectrum", 3GPP TSG RAN Meeting #80, RP-181339, Agenda tem: 9.4.3, Qualcomm Incorporated, Jun. 11-14, 2018, 5 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"New WID on NR-based Access to Unlicensed Spectrum", 3GPP TSG RAN Meeting #82, RP-182878, Agenda Item: 9.1.1, Dec. 10-13, 2018, 7 pages.

"CR on updating requirement for BWP switching delay in TS38.133 (Section 8.6)", 3GPP TSG-RAN WG4 Meeting #88b, R4-1814069, Mediatek Inc., Oct. 8-12, 2018, 2 pages.

"3rd Generation Partnership Project; Technical Specification Group Radio Access Network; Study on Licensed-Assisted Access to Unlicensed Spectrum; {Release 13)", 3GPP TR 36.889, V13.0.0, Jun. 2015, 285 pages.

"3rd Generation Partnership Project; Technical Specification Group Radio Access Network; NR; Multiplexing and channel coding (Release 15)", 3GPP TS 38.212, V15.3.0, Sep. 2018, pp. 1-99.

"3rd Generation Partnership Project; Technical Specification Group Radio Access Network; NR; Physical channels and modulation (Release 15)", 3GPP TS 38.211, V15.3.0, Sep. 2018, pp. 1-96.

International Search Report and Written Opinion received for corresponding Patent Cooperation Treaty Application No. PCT/CN2019/074445, dated Oct. 22, 2019, 9 pages.

* cited by examiner

WIDEBAND COMMUNICATIONS BASED ON AVAILABILITY ASSESSMENT

RELATED APPLICATION

This application claims priority to PCT Application No. PCT/CN2019/074445, filed on 1 Feb. 2019 which is incorporated herein by reference in its entirety.

FIELD

Embodiments of the present disclosure generally relate to the field of telecommunication and in particular, to wideband communications based on availability assessment.

BACKGROUND

In the communications arena, there is a constant evolution ongoing in order to provide efficient and reliable solutions for utilizing wireless communication networks. An example of an emerging telecommunication standard is new radio (NR), for example, the fifth generation (5G) radio access. It has been studied recently NR access networks operating in unlicensed spectrum (which is also referred to as NR-U) and the focus is on wideband operations. The NR unlicensed operation has been studied in the Study Item "NR-based access to unlicensed spectrum" (Study Item description in RP-181339), resulting in TR38.889. A work item for NR-Unlicensed has been approved in RAN plenary meeting #82 (see RP-182878).

There are several wide unlicensed bands and even a single network device or a terminal device can occasionally access very wide bandwidths. Hence, the wideband operation is one of the key building blocks for NR unlicensed. Both carrier aggregation (CA) and bandwidth part (BWP) mechanisms are supported in Rel-15 NR for wideband operations, and it is recommended to support both the mechanism as well in NR-U.

SUMMARY

In general, example embodiments of the present disclosure provide a solution for wideband communications based on availability assessment.

In a first aspect, there is provided a method for communications. The method comprises performing availability assessment on a set of configured frequency subbands to obtain an availability result, the availability result indicating that at least one of the set of configured frequency subbands is available for a period of time for transmission of intended information; transmitting supplementary information that has been prepared using the at least one frequency subband during a first portion of time within the period of time; preparing the intended information based on the availability result; and transmitting the prepared intended information using the at least one frequency subband during a second portion of time within the period of time, wherein the second portion of time follows the first portion of time.

In a second aspect, there is provided a method for communications. The method comprises receiving supplementary information on at least one of a set of frequency subbands during a first portion of time within a period of time, wherein the period of time is allocated for communication of intended information; and receiving the intended information on the at least one frequency subband during a second portion of time within the period of time, wherein the second portion of time follows the first portion of time.

In a third aspect, there is provided an apparatus. The apparatus comprises at least one processor; and at least one memory including computer program codes; the at least one memory and the computer program codes are configured to, with the at least one processor, cause the apparatus to: perform availability assessment on a set of configured frequency subbands to obtain an availability result, the availability result indicating that at least one of the set of configured frequency subbands is available for a period of time for transmission of intended information; transmit supplementary information that has been prepared using the at least one frequency subband during a first portion of time within the period of time; prepare the intended information based on the availability result; and transmit the prepared intended information using the at least one frequency subband during a second portion of time within the period of time, wherein the second portion of time follows the first portion of time.

In a fourth aspect, there is provided an apparatus. The apparatus comprises at least one processor; and at least one memory including computer program codes; the at least one memory and the computer program codes are configured to, with the at least one processor, cause the apparatus to: receive supplementary information on at least one of a set of frequency subbands during a first portion of time within a period of time, wherein the period of time is allocated for communication of intended information; and receive the intended information on the at least one frequency subband during a second portion of time within the period of time, wherein the second portion of time follows the first portion of time.

In a fifth aspect, there is provided an apparatus comprising means for performing steps of the method according to the above first aspect.

In a sixth aspect, there is provided an apparatus comprising means for performing steps of the method according to the above second aspect.

In a seventh aspect, there is provided a non-transitory computer readable medium comprising program instructions for causing an apparatus to perform at least the method according to the above first aspect.

In an eighth aspect, there is provided a non-transitory computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

Figures 6B, 6C, 6D:
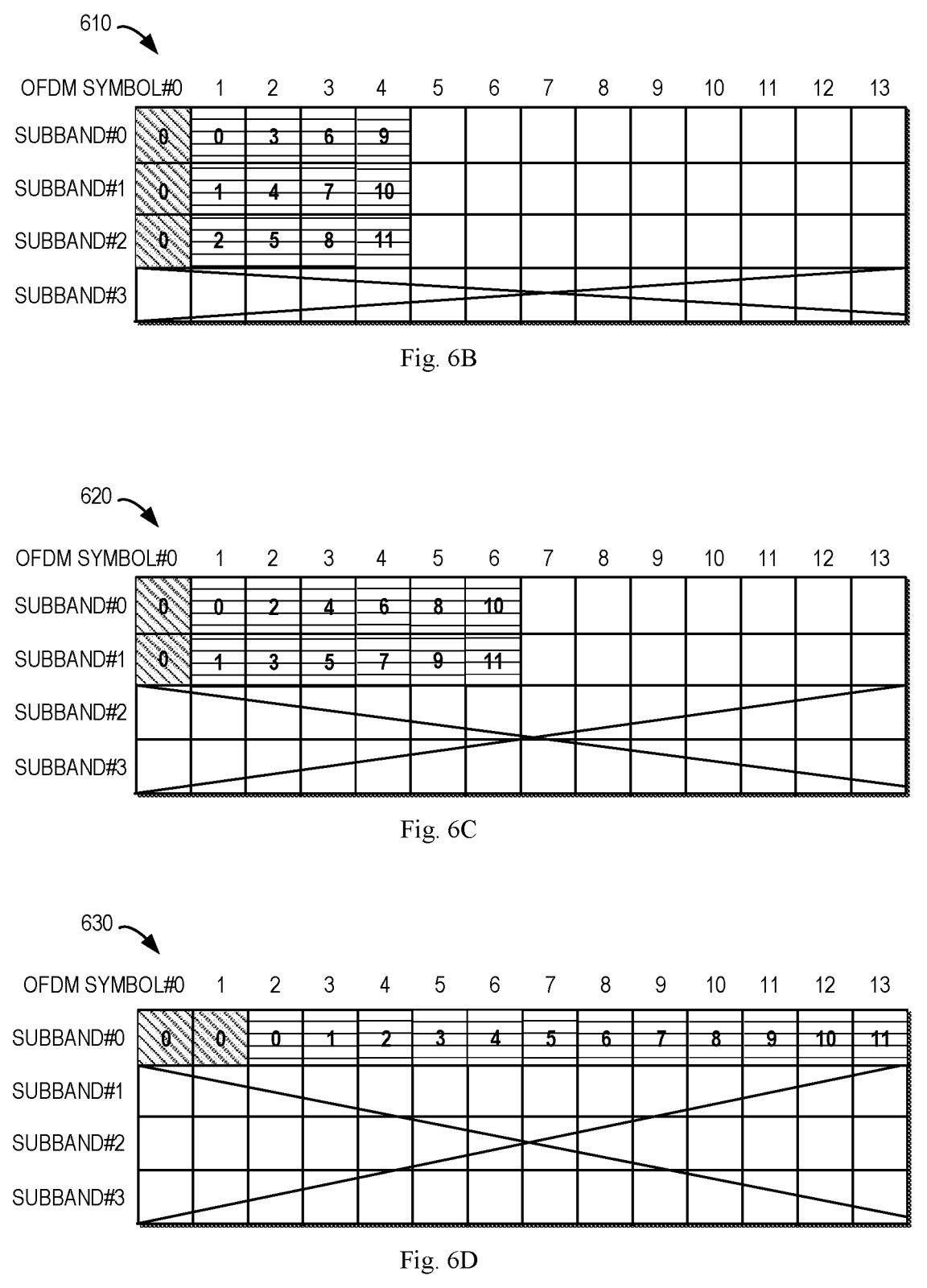

FIGS. 6A to 6D illustrate examples of mapping between downlink information and resources based on the availability result in one time slot in accordance with an example embodiment of the present application;

Throughout the drawings, the same or similar reference numerals represent the same or similar element.

DETAILED DESCRIPTION

Figure 1:
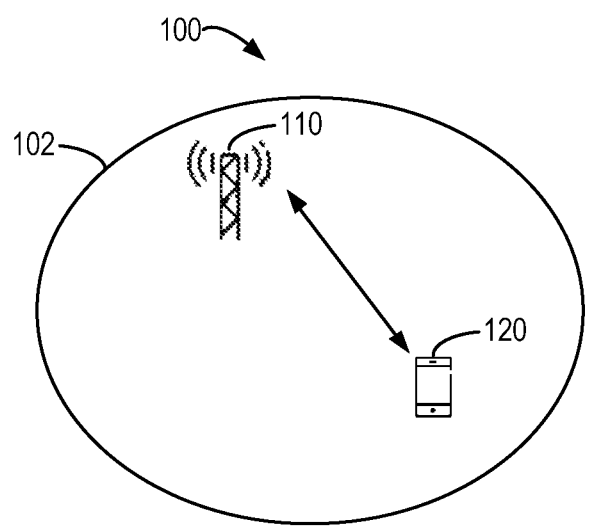
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," and the like may be used herein to describe various elements, these elements should not be limited by these terms. These terms may refer to different or same elements. A first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation of communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay (including Data Unit (DU) part of the integrated access and backhaul (IAB) node), a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a relay (including Mobile Termination (MT) part of the integrated access and backhaul (IAB) node), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication network 100 in which embodiments of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), 2.5G, 2.75G, the third generation (3G), the fourth generation (4G), 4.5G, and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the network device 110 can communicate data and control information to the terminal device 120 and the terminal device 120 can also communicate data and control information to the network device 110. A link from the network device 110 to the terminal device 120 is referred to as a downlink (DL), while a link from the terminal device 120 to the network device 110 is referred to as an uplink (UL). In DL, the network device 110 is a transmitting (TX) device (or a transmitter) and the terminal device 120 is a receiving (RX) device (or a receiver). In UL, the terminal device 120 is a TX device (or a transmitter) and the network device 110 is a RX device (or a receiver).

In the network 100, communications between the network device 110 and the terminal device 120 may be based on unlicensed spectrum, and more particularly, based on unlicensed wide frequency bands. As described above, there are two mechanisms in NR, including carrier aggregation (CA) and bandwidth part (BWP), to support wideband operations. It should be noted that these are not mutually exclusive, for example BWP functionality may be applied within each component carrier when applying the mechanism of CA. To better understand the present disclosure, the wideband operations will be first introduced.

The CA mechanism has been widely adopted in LTE communications and offers several benefits. For example, by applying CA, it is possible to achieve more frequency domain flexibility because aggregated carriers do not need to be adjacent but may be widely apart, which offers diversity for channel access, for example. On the other hand, in CA, each carrier may employ its own listen-before-talk (LBT) meaning agile channel access. Hence, CA may be supported for NR unlicensed in addition to facilitating the licensed assisted access (LAA) operation with NR licensed carriers. Of course, the CA mechanism has also its price, such as requiring multiple radio frequency (RF) chains and increasing the price of UE transceivers. Additionally, CA increases the terminal device's power consumption and has rather considerable latency in the component carrier activation/deactivation to save the terminal device's power.

In Rel-15 NR, the concept of serving cell adaptive bandwidth (BW) was introduced by means of BWPs. The BWP mechanism provides a wideband mechanism when accessing unlicensed spectrum on adjacent channels such as 20 MHz channels and it can also provide savings in the cost at the UE side with a reduced number of RF chains. For example, a single RF chain and Fast Fourier Transform (FFT) processing may be used to access wide bandwidth of an unlicensed band of e.g. 80 MHz, or 160 MHz, or 5 GHz, 6 GHz (potential), or the like. It also improves the trade-off between UE throughput and battery consumption via fast BWP switching. In operation, one or more BWPs per UE (for example, up to 4 BWPs per UE) can be configured separately for UL and DL. In some cases, one of the BWPs may be defined as the default BWP e.g. to facilitate UE battery saving. Both the network device and the terminal device may have one or more BWPs activated at a time.

The contention mechanism is one of the key components for efficient wideband operations. The contention mechanism requires a transmitting device to detect whether a channel is idle (i.e. available) or busy before it starts transmission to a receiving device. Such mechanism may be referred to as availability assessment, which is also called as a listen-before-talk (LBT) procedure or a channel clear assessment (CAA) procedure. Hereinafter, the contention mechanism, the availability assessment, LBT, and CAA are interchangeably used.

Currently, it is planned to be supported, for example, in NR-U, that the availability is assessed separately for each subband. For example, NR-U may support a subband (for example, 20 MHz) grid for the LBT operation at least for the 5 GHz unlicensed wideband because both Wireless-Fidelity (Wi-Fi) and LTE LAA LBT operate on 20 MHz channels and some of the regulatory rules. The regulatory rules include, for example the harmonized standard of European Telecommunications Standards Institute (ETSI) requiring the LBT operation on a 20 MHz grid at 5 GHz band. Correspondingly, it is now captured in a technical report, such as the 3GPP TR38.889 V16.0.0, that for the wideband operation in both DL and UL, bandwidth larger than 20 MHz can be supported with multiple serving cells, and NR-U should support that a serving cell can be configured with bandwidth larger than 20 MHz.

It is noted that no matter whether a single BWP or multiple BWPs are activated at the network device (such as the gNB) or the terminal device (i.e., the UE) for communications, the assessment availability is performed, and the availability result is provided in its own bandwidth granularity (for example, a subband of 20 MHz).

The wideband operations have been discussed above, from which it can be seen that the wideband operations have various benefits including cost savings, reduced switching time, and so on. For wideband operations, such as wideband operations in transmitting information in UL, it has been identified to be beneficial if the UE is not required to change a granted transport block size (TBS) for transmission depending on the availability result. In addition, it has been proposed that multiple starting positions in one or multiple slot(s) are allowed for transmissions scheduled by a single grant and one of the multiple starting positions can be decided on the availability result.

As mentioned above, the assessment availability is always performed with a specific bandwidth granularity (for example, 20 MHz). If the activated wideband (such as one or more BWPs) has a larger bandwidth than the granularity of the assessment availability, the availability result may indicate that parts or the whole of the wideband is available for transmission. Thus, the available transmission bandwidth and frequency location may be varied dynamically. This means that the transmission bandwidth and frequency location may be adjusted based on the availability result with a smaller granularity and transmission is started only on those frequency regions or subbands that are idle and available for transmission. In the situations where a transmission spans over multiple subbands, the transmission may start only on a portion of the configured resources.

However, in either UL or DL transmission in such dynamic transmission bandwidth and frequency location, the problem is that due to processing delays, a transmitting device typically needs to prepare a transport block (TB) to be transmitted on the interface ahead much ahead of time as compared to when the availability assessment is performed. When doing this, the transmitting device may need to assume that the entire set of configured resources would be available for transmission. However, since the availability assessment may turn out that only a subset of the configured resources are available, there can be a mismatch between the prepared TB and the available resources for transmission.

It may be assumed that the transmitting device prepares the data to be transmitted based on the configured resource. The device then transmits the prepared subcarriers only on those subbands on which the contention access is successfully acquired after the availability assessment and drops the subcarriers on the subbands where the contention assess is failed. This corresponds to apply puncturing in correspondence of the unavailable resources, with negative impacts on the decoding performance at the receiver side.

In one solution for UL transmission, a single channel such as for example, physical uplink shared channel, PUSCH, is scheduled over all activated subbands, and the dropped subcarriers are re-transmitted based on code block group (CBG)-based feedback and re-transmissions. In another solution, separate HARQ processes and, correspondingly, separate PUSCHs are allocated for each subband of the UL allocation at the beginning of an UL transmission. Hence, there can be multiple PUSCHs parallel in frequency within the same serving cell. However, if not all the subbands are available after the availability assessment, it may have to drop some of the transport blocks that have been prepared by the medium access control (MAC) layer to be transmitted by the physical (PHY) layer. The same data/TBs therefore need to be rescheduled for transmission on a different bandwidth as the original transmission. This has implications to the MAC scheduler complexity in both the transmitting and receiving devices.

According to an example embodiment, there is provided an efficient solution to adapt prepared transmission to a subband(s) that is determined to be available after availability assessment. In an example embodiment, within a period of time that is allocated for intended information, transmission of the intended information is preceded by transmission of supplementary information. The supplementary information can be prepared before obtaining an availability result for the period of time. After obtaining the availability result, the preparation of the intended information can be completed based on the obtained availability result. As such, the processing of the intended information can be at least partially adapted to the dynamic available subband(s) indicated by the availability result. This may reduce the possibility of dropping the prepared intended information due to the contention failure. In addition, there may not raise implications on the complexity at both the transmitting and receiving sides, which will improve the overall communication performance and efficiency.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 2:
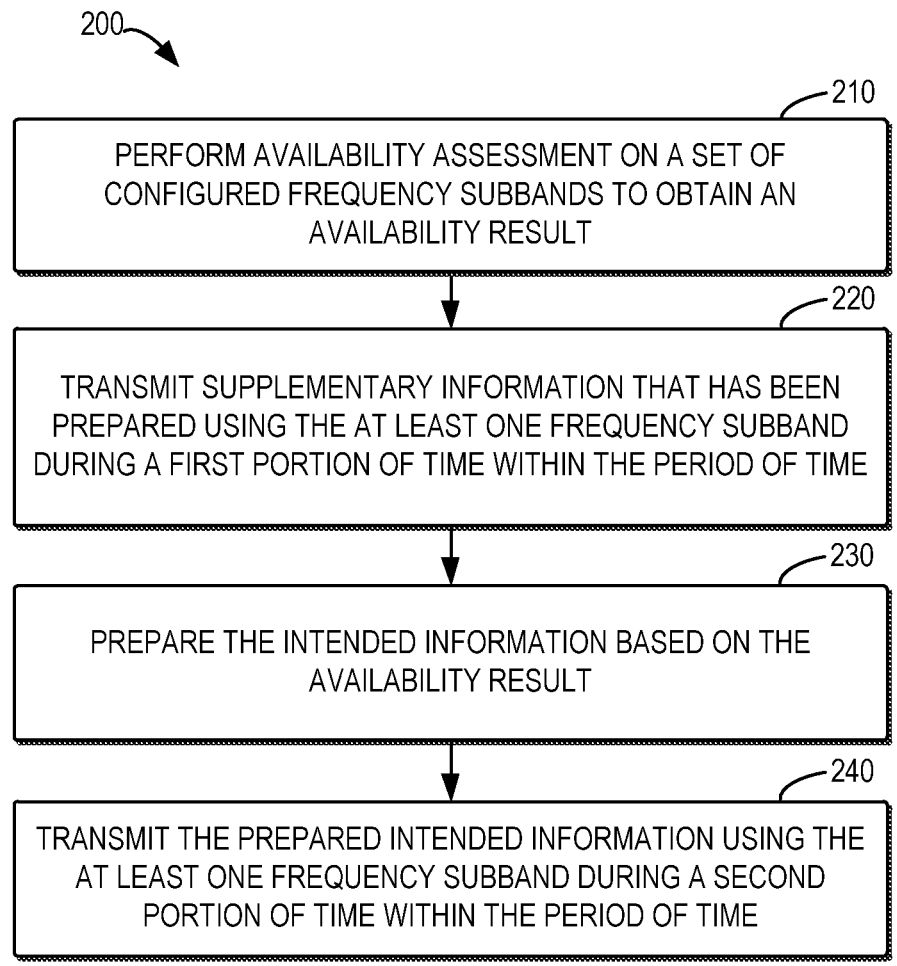
FIG. 2 illustrates a flowchart illustrating a process for wideband transmission based on availability assessment in accordance with an example embodiment of the present disclosure.

Reference is now made to FIG. 2, which shows a process 200 for wideband communications based on availability assessment. The process 200 may involve communication between the terminal device 120 and the network device 110 as illustrated in FIG. 1 and can be implemented at the transmitter side in the communication. In UL communication, the process 200 can be implemented at a terminal device, such as the terminal device 120 as shown in FIG. 1. In DL communication, the process 200 can be implemented at a network device, such as the network device 110 as shown in FIG. 1. In other words, the example process 200 may be employed for either or both of UL and DL transmissions and may be performed at either or both of a network device and a terminal device in communication with each other. In addition, the example process 200 may also be used for device-to-device communications between terminal devices. For the purpose of discussion, an example embodiment of the process 200 will be described with reference to FIG. 1 and described as being performed by the terminal device 120 in UL transmission without loss of generality.

At block 210, the terminal device 120 performs availability assessment on a set of configured frequency subbands to obtain an availability result. The set of frequency subbands include a plurality of subbands that are scheduled, allocated, or configured and are currently activated at the terminal device 120. These frequency subbands may constitute a wideband, such as one or more BWPs. With the configuration of these frequency subbands, the terminal device 120 supports wideband operations. The number of subbands included in the set may be scheduled or configured by the network device 110. In some examples, a subband may have a bandwidth of 20 MHz, and the overall bandwidth for the terminal device 120 may be, for example, 40 MHz, 80 MHz, 160 MHz, or the like. It would be appreciated that the bandwidth of a subband and the overall wide bandwidth may be varied according to actual requirements/configurations in the communication networks. The present disclosure is not limited in this regard.

In an example embodiment, the terminal device 120 would like to transmit intended information to the network device 110. In the example embodiment of UL transmission, the intended information may be UL user data, UL control information, and/or the like. In an example embodiment, the intended information may be information carried by a shared channel such as for example, PUSCH, which may include both UL user data and control information such as a channel quality indication (CQI), pre-coding matrix indication (PMI), rank indication (RI), and the like. It would be appreciated that the intended information may include other types of UL information. The example embodiments may be applicable in the cases where the terminal device 120 obtains a scheduled UL grant and/or is configured with a grant from the network side.

In embodiments of the present disclosure, the set of frequency subbands are not always available for transmission from the terminal device 120. In an example embodiment, the frequency subbands may be in unlicensed spectrum. To transmit intended information, availability assessment (such as a LBT or CAA procedure) is performed to detect whether any of the frequency subbands are available (or idle) for the transmission. In embodiments of the present disclosure, the granularity of the availability assessment may be smaller than the overall bandwidth of the set of frequency subbands and the obtained availability result can indicate whether respective ones of the set of frequency subbands are available. For example, the availability assessment can be separately performed for each of the set of frequency subbands (such as, 20 MHz). It would be appreciated that the granularity of the availability assessment may be equal to or even smaller than a bandwidth of a subband as long as it is possible to determine the availability of the respective subbands.

Various procedures for the availability assessment may be employed by the terminal device 120, including those that are currently utilized or to be developed in the future. Some example procedures are provided below for purpose of illustration.

Specifically, the terminal device 120 may obtain access to one or more of the set of frequency subbands for a period of time by sharing with the network device. Specifically, a device (for example, the network device 110 or the terminal device 120) may occupy a channel with transmissions for a limited time. Such transmission burst (or duration of transmission burst) is referred to as a channel occupancy time (COT) or transmission opportunity (TXOP). The initiating device may share the COT with the responding device; for example, the network device 110 may initiate a COT and share that COT with the terminal device 120 for UL transmissions. In other words, the network device 110 contends for the communication channel and once the network device 110 has obtained access to the channel, it allows the terminal device 120 to use a portion of its COT for UL transmissions.

It is attractive to support UL transmission within COT initiated by the network device 110 as it supports efficiently scheduled transmission.

In an example procedure, when contending for access to the frequency subbands, the terminal device 120 generates a random number N uniformly distributed over a contention window (where the size of contention window depends on the access priority class of the intended information). Once the terminal device 120 has measured a channel to be idle or vacant for N slots, the terminal device 120 may occupy the subband(s) with transmission. To align the transmission with the slot boundary, the terminal device 120 may need to resort to self-deferral during the availability assessment procedure. This type of availability assessment may be performed when initiating COT. This availability assessment procedure may also be referred to Category 4 energy detection LBT procedure.

In another example procedure, the terminal device 120 performs channel measurement in a time interval (such as an interval of 25 us) before transmission. This type of availability assessment may be performed when the network device 110 shares its COT with the terminal device 120, or when the network device 110 continues with DL transmission within its COT. This availability assessment procedure may also be referred to Category 2 energy detection LBT procedure. The gap between DL reception and UL transmission may be less or equal to 25 microseconds in this case. There are also other cases where Category 2 LBT may be used.

In other examples, a Category 1 Immediate Transmission may also be adopted as a possible channel access scheme for an UL burst within a network device initiated COT. In this case, the terminal device 120 may skip the LBT procedure as long as it starts UL transmission within a certain period of time (such as 16 μs) after the end of a DL transmission. Similar availability assessment procedures are used also in LTE LAA/enhanced LAA (eLAA) as well as in MulteFire.

By performing the availability assessment, the terminal device 120 may detect that one or more available frequency subbands are available for transmission of the intended information in a period of time. Such period of time may depend on the availability assessment and/or the UL grant. In an example embodiment, the period of time has a duration of a plurality of symbols such as for example OFDM symbols. In some other embodiments, the period of time has a duration of a time slot. In some further embodiments, the period of time may be varied from one time slot to multiple time slots, for example in the cases when the set of frequency subbands are assigned by the network device 110 for potential UL transmission with a configured UL grant.

Still referring to FIG. 2, the terminal device 120 transmits, at block 220, supplementary information that has been prepared to the network device 110 using the at least one frequency subband during a first portion of time within the period of time.

As mentioned above, the main target of the availability assessment is to transmit the intended information within the period of time. The availability assessment is generally performed shortly before the period of time for transmission. Considering the information processing delay in the terminal device 120 and the desired adaptation to the availability result, the terminal device 120 of the present disclosure has supplementary information prepared before knowing the available frequency subband(s), instead of processing the intended information to be ready for transmission before the subband availability is known. Thus, the transmission of the supplementary information precedes that of the intended information such that there leaves some time (i.e., the first portion of time) for the terminal device 120 to complete the preparation of the intended information after obtaining the availability result. The first portion of time may start at the very beginning of the period of time.

In an example embodiment of the present disclosure, the supplementary information can be any useful UL information that is available for transmission from the terminal device 120 and can be received by the network device 110. The supplementary information may be of a different type from the intended information. One example of such supplementary information may include a reference signal, such as a demodulation reference signal (DMRS) or a sounding reference signal (SRS), and/or the like. The supplementary information may also include a preamble for synchronization, other UL control information, reservation signal, and/or the like.

In an example embodiment, the supplementary information may alternatively or additionally include the same type of information as the intended information, such as information carried by PUSCH. In these embodiments, the information carried by PUSCH may be a part or all of the information to be transmitted for PUSCH (such as the UL user data and/or control information to be carried in PUSCH). Such information carried by PUSCH, as being supplementary information, may also be processed and prepared before obtaining the availability result.

In an example embodiment of the present disclosure, since the supplementary information may be prepared ahead of time as compared to when the availability assessment is performed, the terminal device 120 may prepare the supplementary information according to a configuration or allocation of the intended information, especially based on a hypothesis that the entire set of frequency subbands are available. In an example embodiment, the duration of the first portion of time may be predetermined, for example, as a duration of one or more OFDM/DFT-S-OFDM symbols to be transmitted on the frequency subbands. The prepared supplementary information may be suitable for transmission on the entire set of configured frequency subbands during the first portion of time. For example, the supplementary information may be processed as one or more groups of data symbols that are corresponding to the respective frequency subbands. If there are four configured frequency subbands, the supplementary information may be processed as four groups of data symbols, each to be carried by one set of subcarriers corresponding to one subband of the four subbands.

As used herein, a data symbol refers to a data unit obtained after applying a certain operation(s) on information. A data symbol may include a modulation symbol which is obtained after the modulation operation, which may also be referred to as a "complex-valued data symbol" or "complex-valued symbol." Hereinafter, the terms "modulation symbol," "complex-valued data symbol," and "complex-valued symbol" are interchangeably used. In some cases, the data symbol may include an unmodulated symbol when the modulation operation is not applied before transmitting. Some examples of such unmodulated symbol may include the unmodulated SRS symbol, the unmodulated DMRS symbol, and/or any other pilot symbol that are mapped to transmission resources. An OFDM symbol may contain or carry a group of data symbols that are corresponding to respective frequency subbands on the available bandwidth.

Although the supplementary information has been prepared for the entire set of the frequency subbands, its prepared data symbols may not be all transmitted to the network device 110. The number of data symbols to be transmitted may depend on the availability result of the respective frequency subbands and may also depend on the configuration of the supplementary information. When the availability result is obtained, the terminal device 120 may know whether all or only a part of the set of frequency subbands are available according to the availability result, and thus may determine, according to such availability result, that the number of the set of frequency subbands (sometimes referred to as a first number herein) are available for transmission within the first portion of time. If not all the set of frequency subbands are available, that is, the first number is lower than the number of configured frequency subbands within the first portion of time, the terminal device 120 may transmit a part of the supplementary information, such as the data symbols that are corresponding to the first number of available frequency subbands, using the first number of frequency subbands.

More specifically, the supplementary information may be prepared into data symbols that are suitable to be transmitted across all the configured frequency subbands within the first portion of time. Due to unavailability of some subbands, the terminal device 120 cannot transmit all but only the prepared data symbols corresponding to (mapped to) the available frequency subbands to the network device 110. In an example embodiment, the terminal device 120 may drop a part or all of the remaining supplementary information, such as some or all of the prepared data symbols corresponding to one or more of the unavailable frequency subbands. The terminal device 120 may alternatively or additionally transmit a part or all of the dropped supplementary information after the first portion of time. The transmission may occur in a portion of time in the period of time, for example, after a portion of time for transmitting the intended information, or in-between transmissions of data symbols of the intended information.

In an alternative example on the prepared supplementary information, a plurality of prepared candidates for supplementary information may be prepared, and the proper candidate corresponding to the availability result may be selected to be transmitted. Each of the candidates may be prepared based on a hypothesis that a different combination of the configured frequency subbands is available. For example, if there are four frequency subbands configured for the terminal device 120, the supplementary information may be prepared in a first manner to be mapped to all the four subbands, so as to generate a first prepared candidate, the same supplementary information may be further prepared in a second manner to be mapped to three of the four subbands, so as to generate a second prepared candidate, and so on. If the availability result indicates that the three subbands corresponding to the second prepared candidate are available, such prepared supplementary information may be transmitted accordingly. It is noted that in these cases, the number of configured frequency subbands for which the supplementary information has been prepared may be equal to or less than the total number of all the configured frequency subbands in the set. In an example embodiment, some or all of the candidates may be prepared from different supplementary information (such as different DMRSs).

Upon obtaining the availability result, at block 230, the terminal device 120 prepares the intended information based on the obtained availability result. As such, the intended information can be adapted to the received availability result. The intended information prepared after obtaining the availability result may include UL information that is different from the supplementary information, such as new information for PUSCH. In an example embodiment, the intended information may include a part of the supplementary information that has been prepared but failed to be transmitted due to the unavailable subbands. In such cases, the failed part of information for the supplementary information may be re-processed after obtaining the availability.

In an example embodiment, the intended information may be processed at least partially during transmission of the supplementary information in the first portion of time. Specifically, during the transmission of the supplementary information (i.e., during the first portion of time), the intended information may be processed based on the obtained availability result such that the prepared information can be fitted to the available frequency subband(s) for transmission. The TBS for (the first) transmission of the intended information may be defined by the network device 110, for example, according to the number of the configured frequency subbands in the set. By preparing based on the availability result, the transport block of the intended information may still be fitted in the contended period of time. In addition, the preparation of the intended information may also depend on the resource allocation in the scheduled UL grant or the configured grant.

In an example embodiment, the intended information may be processed in two stages. A first stage starts before obtaining the availability result, or even before the start of the availability assessment, to process the original intended information, generating partially-prepared intended information. A second stage starts after obtaining the availability result, to process the partially-prepared intended information, generating the prepared intended information that is ready for transmission. Generally, the processing of the intended information may include a plurality of processing operations, some of which are sequential processing steps in an order. In these embodiments, all these operations may be categorized or split into a subset of processing operations before the availability assessment or the availability result (for the first stage) and a subset processing operations after the availability assessment or the availability result (for the second stage).

In an example embodiment, the second stage may include at least one of the plurality of processing operations which the terminal device 120 is capable of completing within the first portion of time. In principle, the split point between the processing operations performed before or after the availability assessment can be moved to any earlier step as long as the terminal device 120 can complete with the first portion of time. However, it is preferable to have as few operations as possible after the availability assessment due to related tight processing latency requirements. In some examples, in the first stage, the terminal device 120 may process the intended information up to the operation of IFFT. In the case of Discrete Fourier Transform (DFT)-spread OFDM (DFT-S-OFMD) transmission, the steps of transform precoding (by DFT) as well as (spatial) precoding may be performed in the second stage.

In the first stage, the terminal device 120 may process the intended information based on a configuration on transmission of the intended information, including the constraints and/or parameters required for the intended information. As an example, the processing operations in the first stage before the availability assessment may include, but are not limited to, one of transport block cyclic redundancy check (CRC) attachment, low density parity check (LDPC) base graph selection or Turbo encoding, code block segmentation and code block CRC attachment, channel coding of uplink share channel (UL-SCH), rate matching, code block concatenation, data and control information multiplexing (for intended information including both data and control information, such as PUSCH). By means of these operations, the terminal device 120 may have prepared a multiplexed data and control coded bit sequence. The first stage may continue with the operations of scrambling, modulation, layer mapping, transform precoding (for DFT-S-OFDM only), and/or precoding (related to Single User Multiple Input Multiple Output (SU-MIMO). After these operations, the terminal device 120 may have prepared antenna port-specific signals. It would be appreciated that the above operations are listed for purpose of illustration only. Depending on actual practice, more, less, and/or different processing operations may be included to process the intended information. The scope of the present application is not limited in this regard.

In the second stage, the terminal device 120 may determine the subcarriers and then the resource elements (REs) used for transmission of the intended information on the one or more frequency subbands that are indicated as available by the availability result. A RE may be resource that occupies a duration of an OFDM symbol in time domain and a subcarrier in frequency domain, or a duration of a data symbol within a DFT-S-OFDM symbol. The duration of the intended information may depend on the available frequency subband(s), the scheduled allocation of physical resource block(s) (PRB(s)) for the transmission, and the number of PRBs on which the transmission is started. As the number of available frequency subbands decreases, the duration for the intended information may be increased. The terminal device 120 may map the data symbols generated from the intended information to the determined REs and then performs IFFT and cyclic prefix (CP) processing.

In an example embodiment, the terminal device 120 may have received, via RRC or downlink control information, the whole or partial configuration on the supplementary information (such as the DMRS) that is also used for a duration longer than the scheduled/configured duration for the intended information (such as the PUSCH duration). In this case the terminal device may apply the DMRS configuration or partial DMRS configuration depending on the duration determined for the intended information after the availability assessment.

Some example processing operations in the second stage after the availability assessment may include, but are not limited to, mapping antenna port-specific signals to virtual resource blocks, mapping from virtual to physical resource blocks, data/RS multiplexing (it is assumed here symbol level time domain multiplexing between the supplementary information of RS and the intended information of PUSCH), and/or OFDM baseband signal generation (by IFFT). These operations may be performed based on the availability result. It would be appreciated that the above operations are listed for purpose of illustration only. Depending on actual practice, more, less, and/or different processing operations may be included to process the partially-processed intended information from the first stage. The scope of the present application is not limited in this regard.

It would be appreciated that the processing operations in the first or second stage as listed above are only for purpose of illustration. In other examples, more, less, or different processing operations may be included. The detailed operations of the intended information may be varied depending on the type of the intended information to be transmitted and the configuration of the communication networks.

In an example embodiment, when the intended information includes UL data to be transmitted, no data symbols are multiplexed on the symbols for the supplementary information (such as DMRS symbols) even in the case of CP-OFDM because the part of the supplementary information may be dropped without any remapping. The terminal device 120 may be prepared to transmit the symbols for the supplementary information before the availability assessment, with a hypothesis that the availability assessment on the entire set of frequency subbands all turns out to be successful.

In an example embodiment, data and control information multiplexing of the intended information may depend on the number of subcarriers of the available frequency subband(s). In principle it is possible that all the processing operations starting from data and control multiplexing is performed after the availability assessment. However, in an example embodiment, the data and control information multiplexing may be performed according to the configured bandwidth for transmission (i.e., the bandwidth of the entire set of configured frequency subbands), and the multiplexed stream of data/UCI bits may be just mapped according to the result of the availability assessment. In other words, data and control information multiplexing may not be done according to the actual bandwidth for the transmission.

The preparation of the intended information has been discussed above. As further illustrated in block 240 of FIG. 2, the prepared intended information is transmitted by the terminal device 120 to the network device 110 using the at least one frequency subband during a second portion of time within the period of time. The second portion of time follows the first portion of time. As discussed above, the intended information has been prepared and adapted to the current availability result on the set of frequency subband and can thus be transmitted using the one or more frequency subbands indicated as available. As such, the specific REs as well as the length of the second portion of time may be varied depending on the availability result, as discussed above.

According to the example embodiments, the preparation of the intended information can be adapted depending on the availability result. Thus, a transport block that has been prepared by the MAC scheduler for transmission on the PHY layer does not need to be dropped because of a failure of access in one or more subbands. This does not require fast availability assessment feedback from PHY to MAC, and/or special handling in the MAC scheduler to re-schedule the transmission of the prepared data/TBs on a different bandwidth as the original transmission. This is expected to limit the implications to the MAC scheduler complexity in both the transmitting device.

To better understand the transmission of the supplementary and intended information, some examples are provided. FIGS. 3A to 3D provide examples of mapping between information and resources based on the availability result in one time slot. It would be appreciated that these examples are illustrated for purpose of illustrations, the structure of frequency-time resources and the arrangement of information may be varied in different implementations.

In the illustrated examples, it is assumed that the four subbands, including subband #0 to subband #3, are scheduled/configured for the terminal device 120. It is further assumed that fourteen OFDM symbols are to be transmitted in one time slot, where each OFDM symbol is generated based on respective groups of data symbols mapped to the available frequency subbands. The terminal device 120 have prepared four groups of data symbols 301 of supplementary information (such as DMRS) before acquiring the availability result and mapped the four groups of data symbols 301 to REs of the four subbands, respectively. In addition, twelve groups of data symbols 302 are generated for the intended information (such as PUSCH) (before or after the availability assessment, but not being mapped to REs). It is noted that the legend for the references 301 and 302 remains the same across FIGS. 3A to 3D.

Figure 3A:
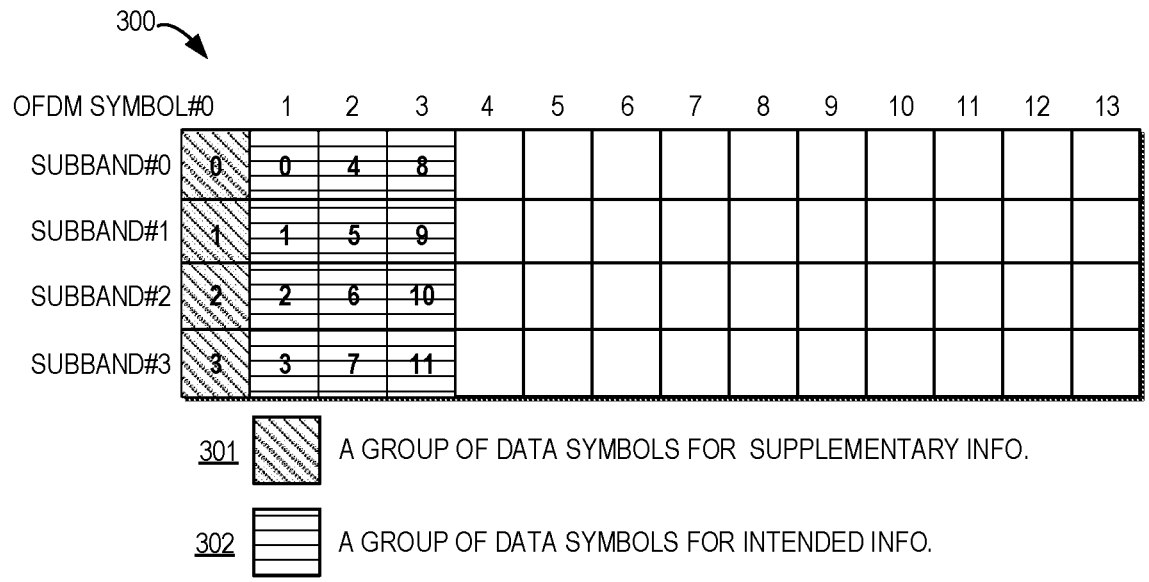
FIGS. 3A to 3D illustrate examples of mapping between uplink information and resources based on the availability result in one time slot in accordance with an example embodiment of the present application.

In the mapping 300 shown in the example of FIG. 3A, the availability result indicates that all the four subbands are available. Thus, the terminal device 120 may transmit all four groups of data symbols 301 that have been mapped to REs of the four available subbands at the beginning of the time slot as the first OFDM symbol (i.e., OFDM symbol #0). According to the availability results, the twelve groups of data symbols 302 for the intended information may be mapped to REs of the four subbands at the following portion of time, as the second to fourth OFDM symbols (OFDM symbol #1, #2, and #3). Note that each data symbol may be mapped to a RE, and each OFDM symbol contains four groups of data symbols across the available bandwidth in this example. The specific number of REs in a group (i.e., in a frequency subband) during an OFDM symbol may depend on the communication specification and configuration employed in the network.

Figure 3B:
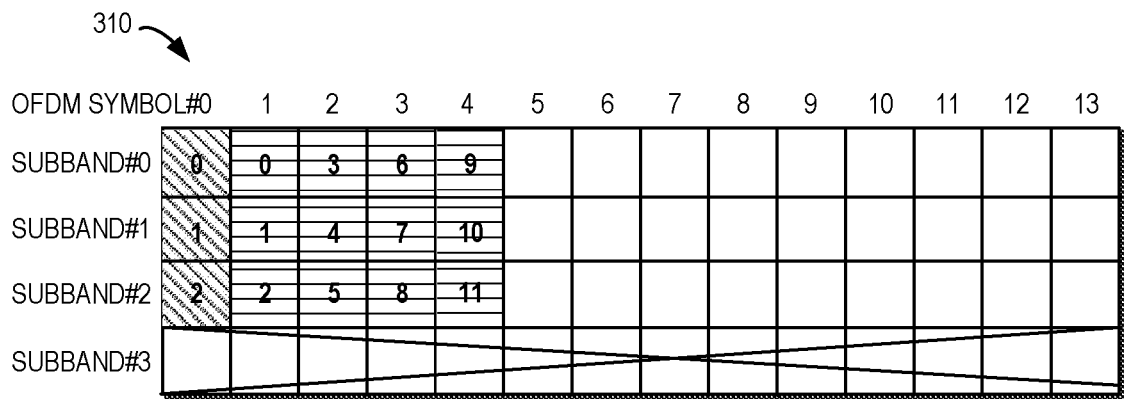

In the mapping 310 shown in the example of FIG. 3B, the availability result indicates that subband #3 is unavailable and thus is blocked. Only the remaining three subbands can be used for information transmission. In this example, one group of the prepared data symbols 301 that are mapped to subband #3 may be dropped by the terminal device 120 and the other three groups of data symbols 301 mapped to subband #0 to subband #2 can still be transmitted. All the twelve groups of data symbols 302 for the intended information can be adapted to map to different REs that are determined in the three available subbands after receiving the availability result.

Figure 3C:
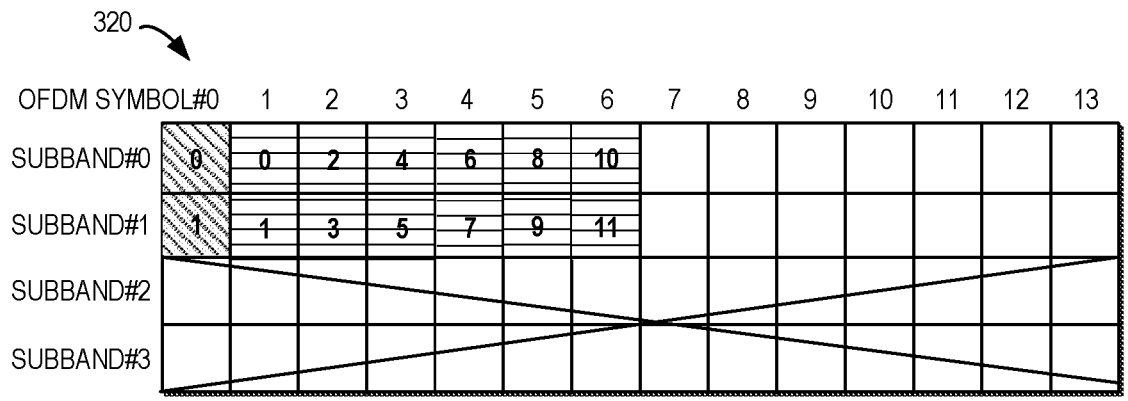

In the mapping 320 shown in the example of FIG. 3C, according to the availability result, the number of the available subbands is reduced to two, where only subband #0 and subband #1 are available. Accordingly, two groups of the prepared data symbols 301 are dropped and only the two groups of data symbols 301 mapped to available subband #0 and subband #1 can be transmitted. The mapping of the twelve groups of data symbols 302 and REs are adapted, for example, by adopting more REs from latter OFDM symbols on each of the available subbands, such that all these data symbols can be transmitted on the available subbands.

Figure 3D:
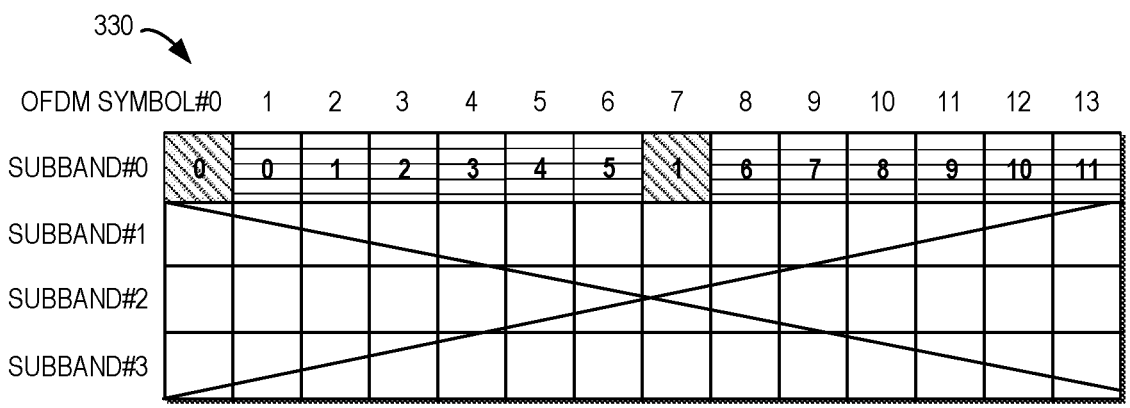

In the mapping 330 shown in the example of FIG. 3D, only one subband (subband #0) is available. Thus, the group of data symbols 301 mapped to subband #0 call be transmitted, and all the twelve groups of data symbols 302 are adapted to be transmitted on subband #0. In addition, in this example, instead of being directly dropped, another group of data symbols 301 may be remapped to subband #0 as part of the eighth OFDM symbol (data symbol #7), inserted between the groups of data symbols 302.

It can be seen from these examples that as the number of the available frequency subbands is reduced, the intended information can be mapped to more OFDM symbols accordingly for transmission, which may increase accordingly the transmission duration of the intended information. The data symbols of a TBS size for the intended information may fill symbols (OFDM symbols in these examples) in all combinations of available subbands. In an example embodiment, if the data symbols prepared from the intended information fill the last OFDM symbol only partially, the remaining empty REs of this OFDM symbol may be, for example, filled with data symbols containing dummy bits (in which way the Tx power does not change).

Figure 4A:
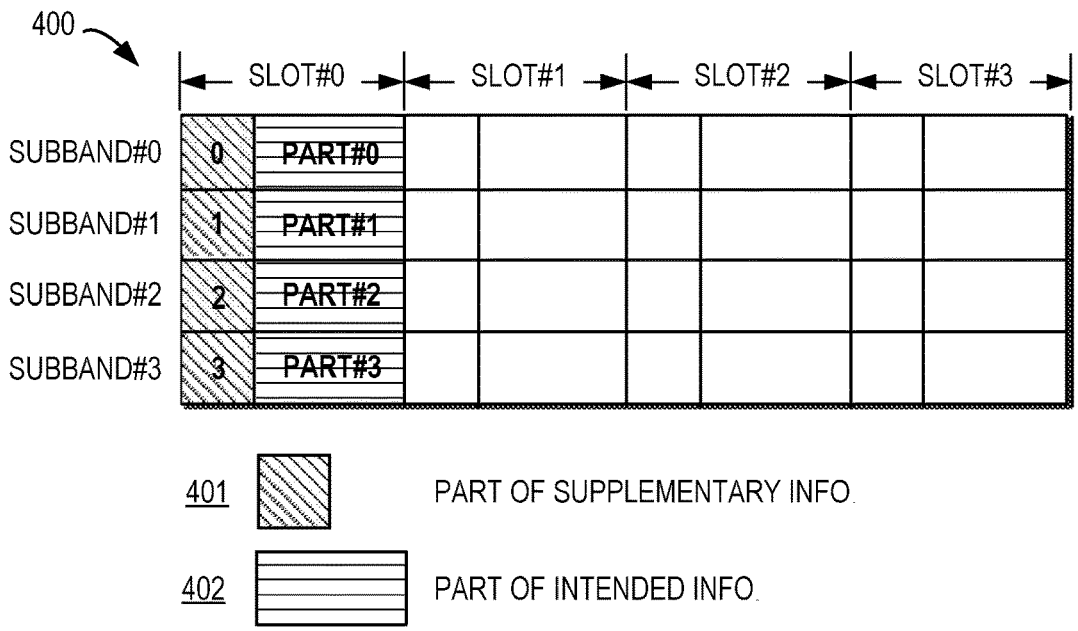
FIGS. 4A to 4C illustrate examples of uplink information communications in adaptation to an availability result across multiple time slots in in accordance with an example embodiment of the present application.
Figure 4B:
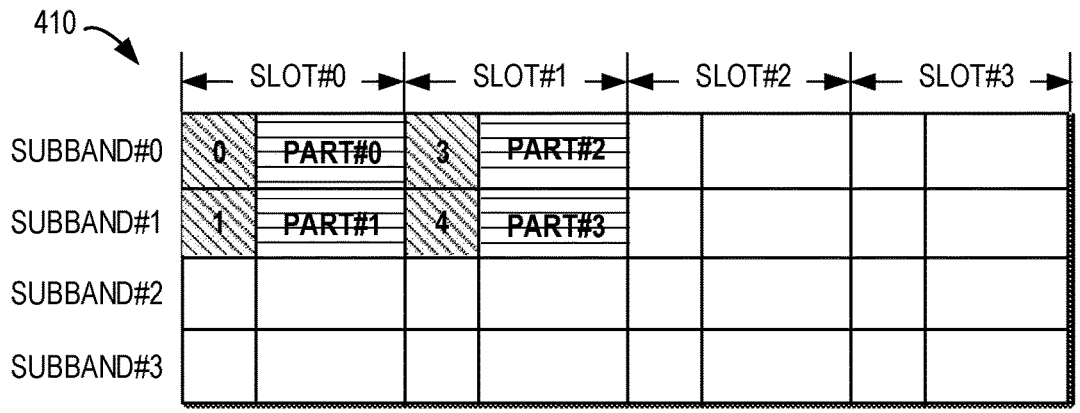
Figure 4C:
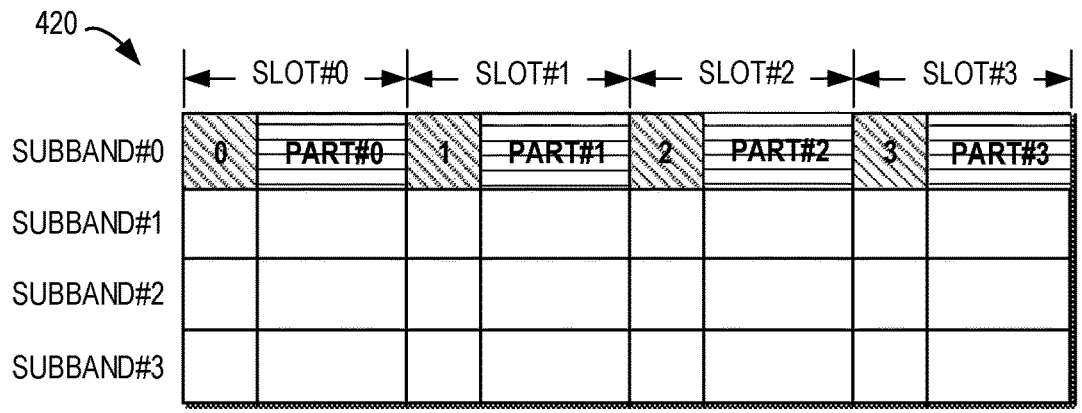

As mentioned above, the period of time, during which the transmission of the intended information can be granted, may last for more than one time slot. In these cases, the prepared intended information may be mapped to resources across a plurality of time slots according to the availability result. FIGS. 4A to 4C illustrate examples of information communications in adaptation to an availability result across multiple time slots. It would be appreciated that these examples are illustrated for purpose of illustrations, the structure of frequency-time resources and the arrangement of information may be varied in different implementations.

In the illustrated examples, it is assumed that the four subbands, including subband #0 to subband #3, are scheduled/configured for the terminal device 120. It is further assumed that fourteen OFDM symbols are to be transmitted in one time slot, where each OFDM symbol is generated based on respective groups of data symbols mapped to the available frequency subbands. The terminal device 120 prepares four parts 401 of supplementary information for the four subbands. In addition, the terminal device 120 prepares four parts 402 of intended information. In these examples, each part of the supplementary or intended information 401 or 402 may be mapped to one or more OFDM symbols within one slot.

From the mapping 400 of FIG. 4A, to mapping 410 of FIG. 4B, and then to mapping 420 of FIG. 4C, it can be seen that the duration of the intended information may vary from one slot to four slots depending on the availability result, similarly as those examples shown in FIGS. 3A to 3D. In the examples of FIG. 4A to 4C, since the resources are sufficient, the supplementary information may also be remapped to other time slots for transmission.

In the above embodiments, the preparation of the intended information is required to be completed in during the first portion of time, which may be a limited time budget for the terminal device 120. In an example embodiment, at the beginning of the period of time allocated for transmitting the intended information, there may be a short time gap for the terminal device 120 to transmit control information, such as information to be carried on a physical uplink control channel (PUCCH), the preparation may also be performed during this time gap, which may provide more time, such as a time span of one or more additional OFDM symbol to perform the preparation.

In an example embodiment, if a longer time budget for the intended information adaptation (for example, longer than an OFDM symbol of the supplementary information) is needed, the terminal device 120 may adopt a 2-stage availability assessment mechanism. In a first stage, first availability assessment is performed to provide a tentative indication on subband availability, and in a second stage after the first stage, second availability assessment is further performed to provide the actual availability of the subbands.

In an example embodiment, the first availability assessment may occur before the time gap assigned for the second availability assessment, and may be performed using one or more empty REs within a period of time allocated for DL transmission, during which one or more terminal devices (the terminal device 120 and/or other terminal device(s)) expect to receive further information from the network device 110. Such period of time for the first availability assessment generally precedes the period of time for transmission of the intended information (as well as the supplementary information). The network device 110 may leave one or more certain REs indicated as being empty in the predefined OFDM symbol or symbols, e.g. in the latter symbol(s) of the DL slot preceding the UL slot. There may be one or more empty REs on each subband. As such, the terminal device 120 may measure the channel energy on these empty RE(s) and estimate, based on that measurement, which subband the following period of time (for example, the following slot) can be assessed for transmission.

The second availability assessment may be performed after the period of time allocated for DL transmission but before the period of time for transmission of the intended information. In some embodiment, the second availability assessment is performed in the normal time gap for availability assessment, which is typically on the slot boundary and is immediately before the period of time for transmission of the intended information, meeting the regulatory requirements. Thus, the result obtained from the second availability assessment may be more accurate since the availability of the subbands may have a less possibility to change. That is to say, the availability result obtained from the later second availability assessment has a higher degree of confidence than the availability result obtained from the first availability assessment.

The first availability assessment utilizes the structure of the preceding DL transmission, such as empty RE frequency and time location and subcarrier spacing while the second availability assessment does not utilize any signal structure in the assessment and can meet the regulatory requirements for the availability assessment. In an example embodiment, the second availability assessment is performed with a bandwidth that is equal to a bandwidth of the set of configured frequency subbands.

Figure 5:
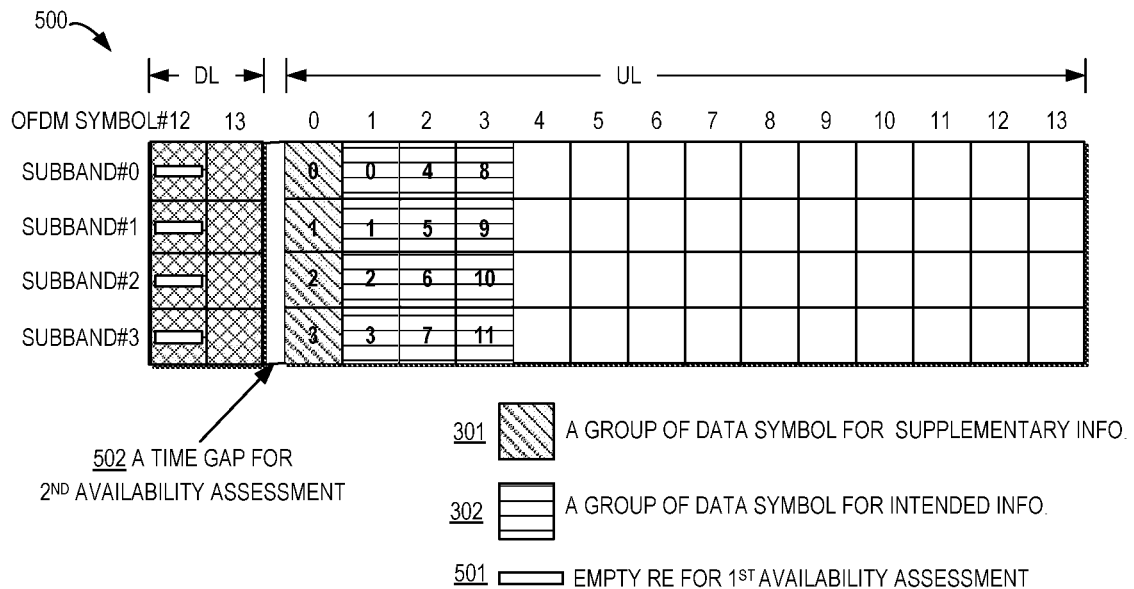
FIG. 5 illustrates an example of two-stage availability assessment in accordance with an example embodiment of the present disclosure.
Figure 6A:
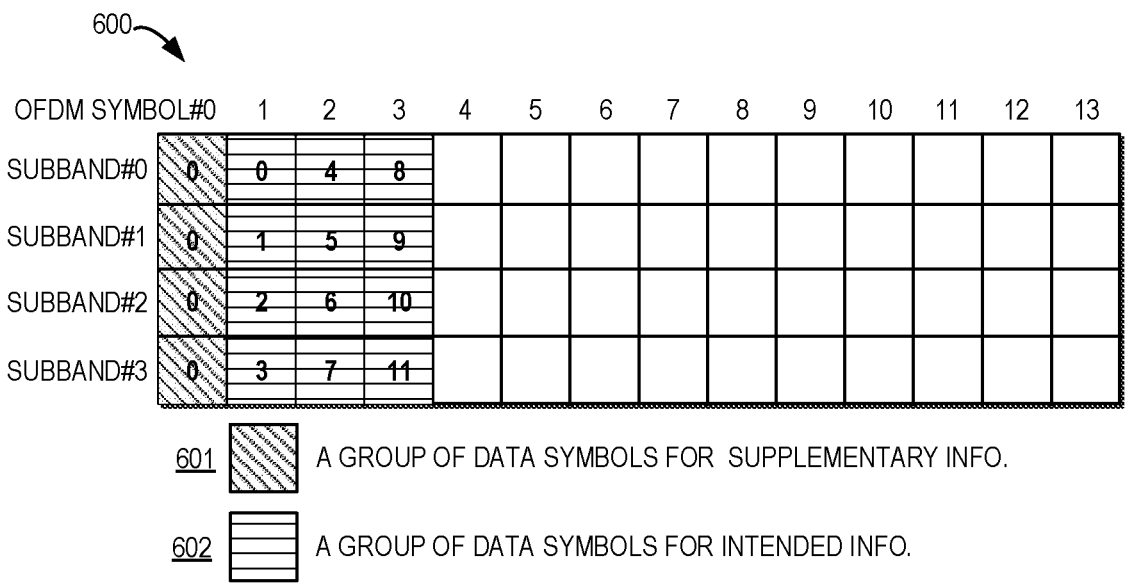

FIG. 5 shows an example of resource mapping 500 in the two-stage availability assessment. The assumption in FIG. 5 is similar to the example shown in FIG. 3A where four subbands, subband #0 to subband #3, are configured and are all available in the slot for DL transmission. As shown in FIG. 5, the first availability assessment is performed on empty REs 501 left in OFDM symbol #12 in the DL slot for transmission from the network device 110. The second availability assessment is performed in a time gap 502 between the DL slot and the UL slot.

It would be appreciated that although empty REs in the DL slot have been illustrated, the first availability assessment may be performed using other resources before the period of time for transmission of the intended information.

In the example embodiments related to the 2-stage availability assessment, the terminal device 120 may prepare the intended information based on the availability result obtained from the first availability assessment. That is, in the above embodiments related to preparing and adaptation of the intended information, the basis for the preparation of the intended information is the availability result of the first availability assessment, which is obtained earlier than when the second availability assessment is performed. In this way, the terminal device 120 has more time to prepare the intended information.

In these embodiments, the preparation of the intended information may start before the period of time for its transmission, for example, before the first portion of time, which allows the terminal device 120 to process the intended information with more time. It is noted that the processing of the intended information may or may not last till the start or the end of the first portion of time. In an example embodiment, the start of the first availability assessment may be determined based at least in part on the processing delay of the terminal device 120 such that the preparation of the intended information may be completed before the end of the first portion of time.

The transmission of the prepared supplementary and intended information may be based on the actual available subband(s) indicated by the availability result of the second availability assessment. If the availability results of both the first and second stages of availability assessments match with each other, which implies that the availability of the frequency subbands does not change from the first stage to the second stage, then the transmission of the prepared supplementary and intended information may be the same as the one-stage availability assessment.

In an example embodiment where the two availability results mismatch, the transmission may be performed depending on the availability result with the higher degree of confidence, i.e., the result from the second stage. More specifically, if the availability result in the first stage indicates that a plurality of frequency subbands are available but the availability result in the second stage indicates that only some of the plurality of frequency subbands are available, the terminal device 120 may transmit, in the first portion of time, the part of the prepared supplementary information that is mapped REs on the one or more subbands indicated as available by both the availability results, and similarly transmit, in the second portion of time, the part of the prepared intended information that is mapped to REs on those available subband(s).

The terminal device 120 may drop a part of the prepared supplementary and/or intended information that are mapped to REs on the frequency subband(s) indicated as unavailable by the availability result in the second stage. In an alternative solution, if the two availability results mismatch on one or some of the frequency subbands or totally mismatch on all the subbands, the terminal device 120 may drop all the prepared intended information, or may also drop the supplementary information.

In the above embodiments of the present disclosure, UL transmission from the terminal device 120 to the network device 110 is described as an example. As mentioned, the unlicensed wideband communication proposed in the present disclosure may also be employed in DL when the network device 110 transmits information to the terminal device 120. In this scenario, the mechanism and its variant embodiments as described above may be similarly applied and achieve similar effects. The difference is that the network device 110 may transmit DL information as the intended information and the supplementary information. The DL intended information and supplementary information may be the same or different types.

In an example embodiment, the intended information in DL may include DL data, such as information in a physical downlink shared channel (PDSCH). In an example embodiment, the supplementary information in DL may include DL control information, such as information for a physical downlink control channel (PDCCH), a DL reference signal, and/or other useful DL information to be transmitted, including further DL data, such as further information for PDSCH. The mapping of the prepared intended and supplementary information may be similar to those examples illustrated for UL.

FIGS. 6A to 6D examples of mapping between downlink information and resources based on the availability result in one time slot in accordance. It would be appreciated that these examples are illustrated for purpose of illustrations, the structure of frequency-time resources and the arrangement of information may be varied in different implementations.

In the illustrated examples, it is assumed that the four frequency subbands, including subband #0 to subband #3, are scheduled/configured for the terminal device 120. It is further assumed that fourteen OFDM symbols are to be transmitted in one time slot, where each OFDM symbol is generated based on respective groups of data symbols mapped to the available frequency subbands. The network device 110 have prepared a group of data symbols 601 for supplementary information (such as PDCCH) before acquiring the availability result and mapped the group of data symbols 601 to one or more of the four different subbands, respectively. In addition, twelve groups of data symbols 602 are generated for the intended information (such as PDSCH) (before or after the availability assessment, but not being mapped to REs). It is noted that the legend for the references 601 and 602 remains the same across FIGS. 6A to 6D.

The mappings 600, 610, 620, and 630 shown in FIGS. 6A to 6D are similar as the examples shown in FIGS. 3A to 3D, where the DL supplementary information (such as the PDCCH) may be transmitted on one or more available subbands in the first OFDM symbol of the DL slot, but the same group of data symbols 601 is mapped to each of the subbands. This may impose some limitations to the scheduler at the network device 110, for example, each scheduled terminal device may have the same allocation (resource allocation, TBS, or the like.) in each subband. The transmission pattern of repeating the same supplementary information across the available subband(s) is especially advantageous when DL control information, such as the information carried by PDCCH, is needed to decode the following DL data carried on PDSCH, for example. As such, the terminal device 120 may decode relevant information on the used DL transmission format independently of the availability result in the DL transmission. In case where one or more subbands are unavailable, the corresponding data symbols for the intended information can be adapted to one of the other subbands which are indicated as available by the availability result (since the resource allocation and TBS is the same on each subband), as shown in the mapping 630.

It would be appreciated that in some other example embodiments in DL transmission, the supplementary information may be transmitted in a way similar as in UL transmission where different groups of data symbols containing different supplementary information (such as further DL data) may also be prepared and then mapped to one or more different subbands.

Figure 7:
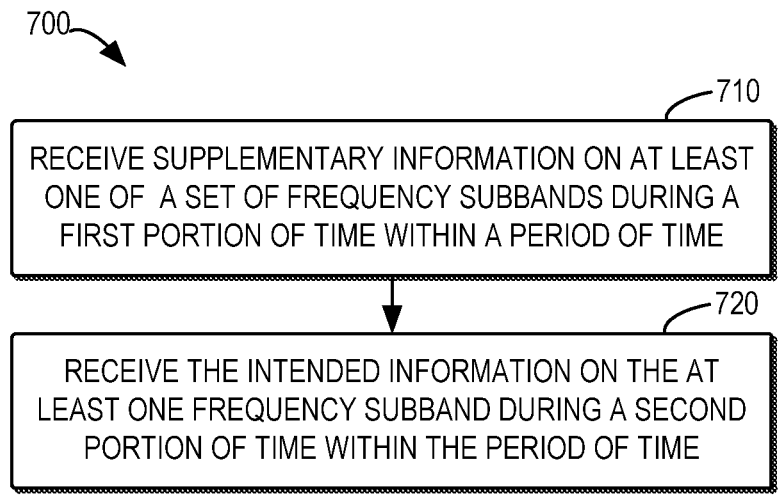
FIG. 7 illustrates a flowchart illustrating a process for wideband reception based on availability assessment in accordance with an example embodiment of the present disclosure.

The wideband operations at the transmitting side (either the terminal device 120 in UL or the network device 110 in DL) have been discussed. At the receiving side, the receiving device operates correspondingly to receive the supplementary information and the intended information transmitted. Still using the receiver in UL, i.e., the network device 110, as an example to describe the operations at the receiving side. FIG. 7 shows a flowchart illustrating a process 700 for wideband reception based on availability assessment in accordance with an example embodiment of the present disclosure.

At block 710, the network device 110 receives supplementary information on at least one of a set of frequency subbands during a first portion of time within a period of time allocated for communication of intended information.

The receiving device may use various approaches to determine the bandwidth and the specific subbands that are available for the transmitting device. In an example embodiment, if the terminal device 120 transmits a RS or other information known by the network device 110, the network device 110 may perform blind detection on respective ones of the set of frequency subbands and detect the RS on at least one of the set of frequency subbands based on a result of the blind detection. In this way, the network device 110 may determine that the subband(s) on which the RS is detected is currently utilized by the terminal device 120. At the same time, the network device 110 can receive the supplementary information (i.e., the reference signal). It would be appreciated that other approaches that can determine the bandwidth may also be employed and the present disclosure is not limited in this regard.

At block 720, the network device 110 receives the intended information on the at least one frequency subband during a second portion of time within the period of time. The second portion of time follows the first portion of time. When the supplementary information is received, the network device 110 may determine the frequency subband(s) utilized by the terminal device 120 and thus may directly perform detection on the determined frequency subband(s) to receive the intended information. In addition, by determining the bandwidth of the utilized subband(s), the network device 110 may further determine the duration of the intended information (such as the second portion of time), for example, based on the predetermined mapping manners that are possibly used by the terminal device 120 in each of the different combinations of available subbands. In this way, the network device 110 may detect the reception energy at the corresponding portion of time on the determined frequency subband and decode the intended information based on the detected energy.

In an example embodiment, an apparatus capable of performing the process 200 (for example, the terminal device 120) may comprise means for performing the respective steps of the process 200. The means may be implemented in any suitable form. For example, the means may be implemented in a circuitry or software module.

In an example embodiment, the apparatus comprises means for performing availability assessment on a set of configured frequency subbands to obtain an availability result, the availability result indicating that at least one of the set of configured frequency subbands is available for a period of time for transmission of intended information; means for transmitting supplementary information that has been prepared using the at least one frequency subband during a first portion of time within the period of time; means for preparing the intended information based on the availability result; and means for transmitting the prepared intended information using the at least one frequency subband during a second portion of time within the period of time, where the second portion of time follows the first portion of time.

In an example embodiment, the apparatus further comprises means for performing other steps in an example embodiment of the process 200. In an example embodiment, the means comprises at least one processor; and at least one memory including computer program code, the at least one memory and computer program code configured to, with the at least one processor, cause the performance of the apparatus.

In an example embodiment, an apparatus capable of performing the process 700 (for example, the network device 110) may comprise means for performing the respective steps of the process 700. The means may be implemented in any suitable form. For example, the means may be implemented in a circuitry or software module.

In an example embodiment, the apparatus comprises means for receiving supplementary information on at least one of a set of frequency subbands during a first portion of time within a period of time, where the period of time is allocated for communication of intended information; and means for receiving the intended information on the at least one frequency subband during a second portion of time within the period of time, where the second portion of time follows the first portion of time.

In an example embodiment, the apparatus further comprises means for performing other steps in an example embodiment of the process 700. In an example embodiment, the means comprises at least one processor; and at least one memory including computer program code, the at least one memory and computer program code configured to, with the at least one processor, cause the performance of the apparatus.

Figure 8:
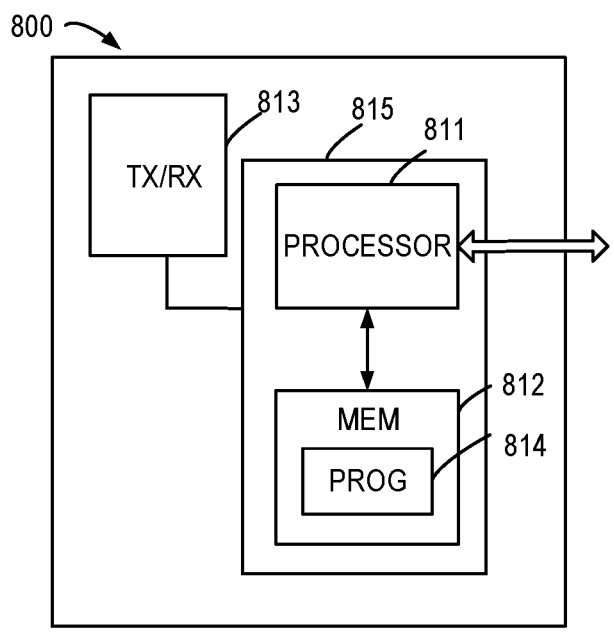
FIG. 8 illustrates a simplified block diagram of an apparatus that is suitable for implementing embodiments of the present disclosure.

FIG. 8 illustrates a simplified block diagram of an apparatus 800 that can be embodied as or comprised in the terminal device 120 or the network device 110 shown in FIG. 1, to implement embodiments of the present disclosure.

The apparatus 800 comprises at least one processor 811, such as a data processor (DP) and at least one memory (MEM) 812 coupled to the processor 811. The apparatus 99 may further include a transmitter TX and receiver RX 813 coupled to the processor 811, which may be operable to communicatively connect to other apparatuses. The MEM 812 stores a program or computer program code 814. The at least one memory 812 and the computer program code 814 are configured to, with the at least one processor 811, cause the apparatus 800 at least to perform in accordance with embodiments of the present disclosure, for example the process 200 or 700.

A combination of the at least one processor 811 and the at least one MEM 812 may form processing means 815 configured to implement various embodiments of the present disclosure. Various embodiments of the present disclosure may be implemented by computer program executable by the processor 811, software, firmware, hardware or in a combination thereof.

The MEM 812 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 811 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions are made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram code 814 in FIG. 8). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process 200 or 700 as described above with reference to FIGS. 3 and 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the example embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A method, comprising:
    performing availability assessment on a set of configured frequency subbands to obtain an availability result, the availability result indicating that at least one of the set of configured frequency subbands is available for a period of time for transmission of intended information;
    transmitting supplementary information that has been prepared using the at least one frequency subband during a first portion of time within the period of time;
    preparing the intended information based on the availability result; and
    transmitting the prepared intended information using the at least one frequency subband during a second portion of time within the period of time, wherein the second portion of time follows the first portion of time,
    the method further comprising:
    processing, before obtaining the availability result, the intended information in a first stage based on a configuration on transmission of the intended information, to obtain partially-prepared intended information; and
    wherein preparing the intended information comprises:
    processing the partially-prepared intended information in a second stage based on the availability result to obtain the prepared intended information that is ready for transmission.

2. The method of claim 1, further comprising:
    performing, after the availability assessment, further availability assessment on the set of subbands to obtain a further availability result, the further availability result indicating that at least one of the set of configured frequency subbands is available for the period of time.

3. An apparatus, comprising:
    at least one processor; and
    at least one memory including computer program codes;
    the at least one memory and the computer program codes are configured to, with the at least one processor, cause the apparatus to
        perform availability assessment on a set of configured frequency subbands to obtain an availability result, the availability result indicating that at least one of the set of configured frequency subbands is available for a period of time for transmission of intended information;
        transmit supplementary information that has been prepared using the at least one frequency subband during a first portion of time within the period of time;
        prepare the intended information based on the availability result; and
        transmit the prepared intended information using the at least one frequency subband during a second portion of time within the period of time,
    wherein the second portion of time follows the first portion of time,
    wherein the at least one memory and the computer program codes are configured to, with the at least one processor, cause the apparatus to:
    process, before obtaining the availability result, the intended information in a first stage based on a configuration on transmission of the intended information, to obtain partially-prepared intended information; and
    wherein when preparing the intended information, the at least one memory and the computer program codes are configured to, with the at least one processor, cause the apparatus to:
        process the partially-prepared intended information in a second stage based on the availability result to obtain the prepared intended information that is ready for transmission.

4. The apparatus of claim 3, wherein a plurality of processing operations are to be applied on the intended information to obtain the prepared intended information, and the second stage comprises at least one of the plurality of processing operations which the apparatus is capable of completing within the first portion of time.

5. The apparatus of claim 3, wherein when transmitting the supplementary information, the at least one memory and the computer program codes are configured to, with the at least one processor, cause the apparatus to:
    determine, based on the availability result, that a first number of the set of configured frequency subbands are available for transmission within the first portion of time; and
    in response to the first number being lower than the number of configured frequency subbands prepared for the supplementary information within the first portion of time, transmit a first part of the supplementary information corresponding to the first number of frequency subbands using the first number of frequency subbands.

6. The apparatus of claim 5, wherein the at least one memory and the computer program codes are configured to, with the at least one processor, cause the apparatus to:
    drop a second part of the supplementary information corresponding to a further frequency subband that is determined as unavailable based on the availability result, and/or
    transmit at least part of the dropped supplementary information using a frequency subband that is determined as available based on the availability result during a third portion of time within the period of time, wherein the third portion of time follows the second portion of time.

7. The apparatus of claim 3, wherein when preparing the intended information, the at least one memory and the computer program codes are configured to, with the at least one processor, cause the apparatus to:
    determine, based on the availability result, resource elements on the at least one frequency subband within the second portion of time, and
    map the intended information to the determined resource elements; and
    wherein when transmitting the prepared intended information, the at least one memory and the computer program codes are configured to, with the at least one processor, cause the apparatus to:
    transmit the intended information based on the mapping using the determined resource elements.

8. The apparatus of claim 3, wherein the at least one memory and the computer program codes are configured to, with the at least one processor, cause the apparatus to:
    perform, after the availability assessment, further availability assessment on the set of subbands to obtain a further availability result, the further availability result indicating that at least one of the set of configured frequency subbands is available for the period of time.

9. The apparatus of claim 8, wherein when performing the availability assessment, the at least one memory and the computer program codes are configured to, with the at least one processor, cause the apparatus to:
    perform the availability assessment using at least one empty resource element within a further period of time preceding the period of time, the further period of time being allocated for communication of further information; and
    wherein when performing the further availability assessment, the at least one memory and the computer program codes are configured to, with the at least one processor, cause the apparatus to:
    perform the further availability assessment after the further period of time and before the period of time on a bandwidth that is equal to a bandwidth of the set of configured frequency subbands.

10. The apparatus of claim 8, wherein the availability result indicates that a plurality of frequency subbands in the set are available, and wherein when transmitting the prepared intended information, the at least one memory and the computer program codes are configured to, with the at least one processor, cause the apparatus to:
    transmit a part of the prepared intended information corresponding to at least one of the plurality of frequency subbands that is also indicated as available by the further availability result; and
    drop a part of the prepared intended information corresponding to at least one of the plurality of frequency subbands that is indicated as unavailable by the further availability result.

11. The apparatus of claim 10, wherein when transmitting the supplementary information, the at least one memory and the computer program codes are configured to, with the at least one processor, cause the apparatus to:
    transmit a part of the supplementary information corresponding to the at least one frequency subband that is also indicated as available by the further availability result.

12. The apparatus of claim 3, wherein when preparing the supplementary information, the at least one memory and the computer program codes are configured to, with the at least one processor, cause the apparatus to:
    prepare the supplementary information based on a hypothesis that the entire set of configured frequency subbands are available.

13. The apparatus of claim 3, wherein the intended and supplementary information comprises different types of uplink information, or different types of downlink information.

14. The apparatus of claim 13, wherein the intended information comprises information for a physical uplink shared channel, and the supplementary information comprises an uplink reference signal and/or further information for a physical uplink shared channel, or
    wherein the intended information comprises downlink data, and the supplementary information comprises information for a physical downlink control channel and/or further downlink data.

15. An apparatus, comprising:
    at least one processor; and
    at least one memory including computer program codes;
    the at least one memory and the computer program codes are configured to, with the at least one processor, cause the apparatus to
    receive supplementary information on at least one of a set of frequency subbands during a first portion of time within a period of time, wherein the period of time is allocated for communication of intended information; and
    receive the intended information on the at least one frequency subband during a second portion of time within the period of time, wherein the second portion of time follows the first portion of time,
    wherein the supplementary information comprises at least a reference signal, and wherein when receiving the supplementary information, the at least one memory and the computer program codes are configured to, with the at least one processor, cause the apparatus to:
    receive the reference signal on at least one of the set of frequency subbands by performing blind detection on respective ones of the set of frequency subbands, and
    wherein the at least one memory and the computer program codes are configured to, with the at least one processor, cause the apparatus to:
    determine the second portion of time within the period of time based on the number of the at least one frequency subband on which the supplementary information is received.

* * * * *